United States Patent [19]

Assow et al.

[11] Patent Number: 4,607,319
[45] Date of Patent: Aug. 19, 1986

[54] FLYBACK DC/DC CONVERTER WITH LOW RIPPLE IN THE OUTPUT CAPACITOR

[75] Inventors: Bengt H. Assow, Norsborg; Curt E. Jansson, Farsta; Kjell O. Rolleberg, Norsborg, all of Sweden

[73] Assignee: Telefonaktiebolaget LM Ericsson, Stockholm, Sweden

[21] Appl. No.: 767,728

[22] Filed: Aug. 20, 1985

Related U.S. Application Data

[63] Continuation of Ser. No. 471,013, Mar. 1, 1983.

[30] Foreign Application Priority Data

Mar. 25, 1982 [SE] Sweden ................................ 8201916

[51] Int. Cl.<sup>4</sup> .......................................... H02M 3/335
[52] U.S. Cl. ...................................... 363/20; 323/222; 363/48; 363/131
[58] Field of Search ......................... 307/138; 323/222; 363/16, 18, 19, 20, 21, 45, 47, 48, 131, 135

[56] References Cited

U.S. PATENT DOCUMENTS

| 3,989,995 | 11/1976 | Peterson | 363/19 |
| 4,184,197 | 1/1980 | Cuk et al. | 363/16 |
| 4,257,087 | 3/1981 | Cuk | 363/16 |
| 4,262,328 | 4/1981 | Bloom et al. | 363/16 |
| 4,274,133 | 6/1981 | Cuk et al. | 363/20 |

FOREIGN PATENT DOCUMENTS

| 8201627 | 5/1982 | PCT Int'l Appl. | 363/19 |
| 0743137 | 6/1980 | U.S.S.R. | 323/222 |

Primary Examiner—William H. Beha, Jr.
Assistant Examiner—Jeffrey Sterrett
Attorney, Agent, or Firm—Roberts, Spiecens & Cohen

[57] ABSTRACT

A flyback type DC/DC converter includes an input filter with input capacitor ($C_1$), an inductance (L) in series with a power transistor (T) and an output filter with an output capacitor ($C_2$). The input capacitor ($C_1$) is connected in series with the output capacitor ($C_2$) and to the input terminals of the converter to compensate the ripple current in the output capacitor ($C_2$).

3 Claims, 4 Drawing Figures

FLYBACK DC/DC CONVERTER WITH LOW RIPPLE IN THE OUTPUT CAPACITOR

This is a continuation of application Ser. No. 471,013, filed Mar. 1, 1983.

FIELD OF INVENTION

The present invention relates to a flyback DC/DC converter, and more specifically to a converter containing a transitors as the switching element and also having input and output filters. Such a converter is used, for example, as a basic circuit in a power pack for telephone exchange components.

BACKGROUND

For rack power in telephone exchanges, it is known to utilize DC/DC converters, which convert an available supply voltage (e.g., $-48$ V) to a smaller and stabilized valve (e.g., $+5$ V). The flyback DC/DC converter of the type mentioned is suitable because of its small space requirements and small number of components. As distinguished from other kinds of converters, a flyback converter has a smaller number of power semiconductors and magnetic components and is simpler to operate. It is furthermore easy to provide with several outputs.

According to a principle for such a converter, the power transistor therein is driven to alternating between conducting and non-conducting states. When the transistor is conducting, energy is stored in a magnetic component (e.g., a transformer or inductance) and the load is disconnected. When the transistor is non-conducting, the magnetic energy of the magnetic component is supplied to the load. In the literature, the flyback converter is also known as a DC/DC converter with rectification during return or flyback.

There is an output filter for filtering the output voltage, and an input filter for preventing transients from the switching circuits from reaching the supply voltage source. Both these filters usually utilize capacitors, and a troublesome ripple current can occur, especially in the capacitors of the output filter.

SUMMARY OF THE INVENTION

The above-mentioned problems with ripple currents in the flyback converter can be solved to a certain extent by complicated design of the output filter, where the ripple has the greatest effect. Such a solution is not advantageous however, since as such designing of the smoothing filter in the converter output requires more of components and space.

An object of the present invention is to provide a DC/DC converter of the kind mentioned above, in which measures are taken for substantially reducing the ripple in the output filter capacitor without complicating the design.

The basic idea in the proposed invention is to galvanically connect the input capacitor (included in the input filter) with the output capacitor, such that the ripple in the input capacitor can compensate the ripple in the output capacitor, whereby the latter ripple can be kept low.

In achieving the above and other objects and features of the invention there is provided, in accordance therewith, a fly-back DC/DC converter for converting an incoming DC voltage across a first and a second input terminal to an outgoing DC voltage across a first and a second output terminal comprising an input filter having at least an input capacitor, including first and second terminals, an inductance means, controllable switch means connected in series with said inductance means to constitute a series connected means for controlling switching in said converter, said switch means being controllable to conducting and non-conducting states alternately, the series connected switch means and inductance means being connected between the second input and output terminals, and an output filter including at least an output capacitor, including first and second terminals, the first terminal of the input capacitor being connected to said second input terminal. In addition, the first terminal of the output capacitor is connected to the second output terminal and there is provided a junction through which the second terminals of the capacitors are interconnected, the junction of the second terminals of the capacitors being connected to the first output terminal, the input and output capacitors being series connected between the second input terminal and the first output terminal so that, during operation of the switch means, the ripple current from the input capacitor compensates the ripple current through the output capacitor. There is furthermore provided a unilateral conducting device coupled in series with the switch means and no more than part of the inductance means between the aforesaid junction and the second input terminal.

The above and other objects, features and advantages of the invention will be found in the Detailed Description Of A Preferred Embodiment which follows hereinbelow.

DETAILED DESCRIPTION OF INVENTION

By way of introduction, a flyback converter of known implementation will be described in detail with reference to the FIG. 1, and subsequently the converter in accordance with the invention (FIGS. 2 and 3) will be described.

Figure 1:
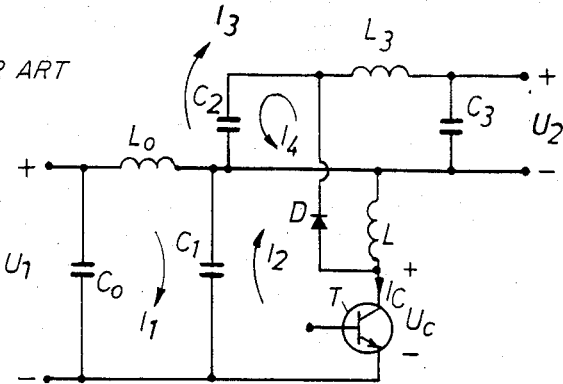
FIG. 1 illustrates in a schematic diagram the basic features of a known flyback converter.

The basic features of a known flyback converter are apparent from the circuit diagram in FIG. 1. The supply voltage, e.g. $-48$ V, is denoted by $U_1$, and is connected across the converter's input filter, which includes capacitors $C_0$, $C_1$ and the inductor $L_0$. The switching path of the converter in this case has a choke L and a power transistor T, of the n-p-n type, connected in series with the choke L. A freewheeling diode D is connected to the collector of transistor T and to one plate of the capacitor $C_2$, which is in turn connected to an output filter formed by $L_3$ and capacitor $C_3$. The output DC voltage obtained in denoted $U_2$. The control circuits for the transistor T and the feedback circuit from the converter output are, as with FIGS. 2 and 3, not included, since these do not touch upon the inventive concept.

Figure 4:
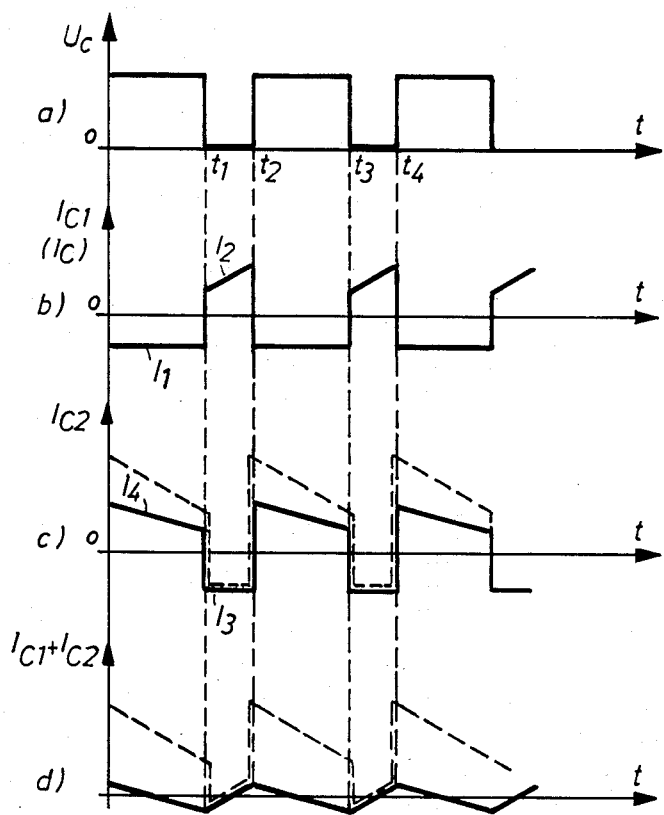
FIG. 4 is a time diagram for explaining the function of the converter according to FIGS. 1-3.

Turning now to the time diagram according to FIG. 4, the function of both known, as well as the proposed converter of the invention will next be explained in detail from the ripple aspect.

During the time interval $0$-$t_1$ the transistor T is assumed to be in the off state and its collector voltage $U_c$ is high, see FIG. 4a. When the transistor T is in this state a charge current $I_{c1}=I_1$ flows to the capacitor $C_1$ via the input filter $L_0$,$C_0$ from the supply voltage source, $U_1$, see FIG. 4b. A charge current $I_{c2}=I_4$ simultaneously flows from the inductance L through the diode D to the capacitor $C_2$, see FIG. 4c.

When the transistor T is conducting during the interval $t_1-t_2$, its collector voltage $U_c$ in FIG. 4a is low. The capacitor $C_1$ is discharged and a current $I_2$ flows from the capacitor $C_1$ through the inductance L and the conducting transistor T, see FIG. 4b. The capacitor $C_2$ is simultaneously discharged and a current $I_3$ according to FIG. 4c flows to the output filter $L_3$,$C_3$. The current $I_1$ and $I_2$ cause a ripple in the capacitor $C_1$ during the respective time interval, and the currents $I_3$ and $I_4$ cause a ripple in the capacitor $C_2$ during the corresponding time interval.

Figure 2:
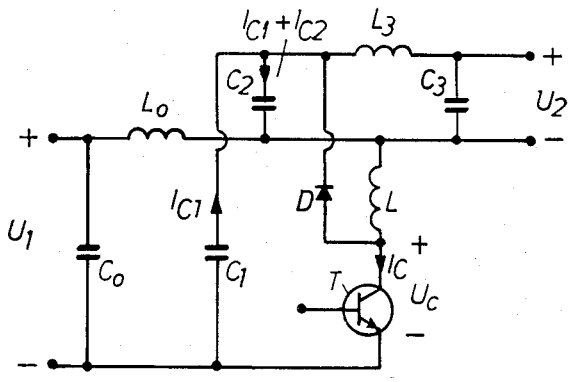
FIG. 2 is the circuit diagram of the same kind of converter according to the present invention.

According to the inventive idea, the input and output capacitors $C_1$ and $C_2$ are mutually connected, so that one plate of the capacitor $C_1$ is connected to a plate of the capacitor $C_2$, as will be seen from the circuit diagram according to FIG. 2. There thus arises a common current path for the capacitors $C_1$ and $C_2$. The circuit is otherwise the same as in FIG. 1.

The capacitor $C_1$ is discharged in this case via the capacitor $C_2$ when the transistor T is conducting, and is charged from the converter input when the transistor T is in the off state. The capacitor $C_2$ is discharged when the transistor T is conducting and is charged when the transistor T is in the off state. This gives a ripple current on the capacitor $C_2$, but this current is in counter-phase compared with the ripple current from the capacitor $C_1$. The two counter-directed currents $I_1$ and $I_2$, which charge and discharge the capacitor $C_1$, respectively, will now flow through the capacitor $C_2$ also. The ripple current through the capacitor $C_1$ is also formed here from the currents $I_1$ and $I_2$ during the intervals $0$-$t_1$ and $t_1$-$t_2$, respectively, but the ripple in the capacitor $C_2$ is formed by $I_1$-$I_4$ and $I_2$-$I_3$, respectively, which have low value. FIG. 4d shows the ripple current ($I_4$-$I_1$) and ($I_2$-$I_3$) during the time intervals $t_o$-$t_1$ and $t_1$-$t_2$, respectively. The ripple in the output capacitor $C_2$ has thus been substantially reduced, which results in lower demand for filtering via the converter output. The output filter $L_3$,$C_3$ may possibly be dispensed with entirely. By connecting together the input capacitor $C_1$ with the output capacitor $C_2$ in accordance with the above, the ripple in the latter is compensated nearly completely, except for a magnetizing current in the choke L.

Figure 3:
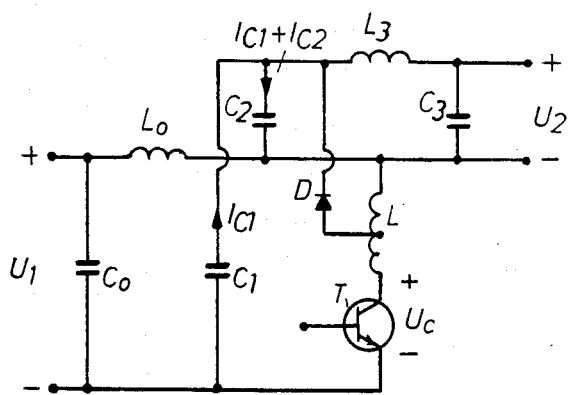
FIG. 3 is the circuit diagram of an embodiment of the converter according to FIG. 2.

If the output voltage is low, an embodiment of the converter according to FIG. 3 is advantageous. In this embodiment the diode D is connected to a terminal on the choke L (or a primary winding terminal if the choke L is replaced by a transformer winding), the gain then being $n_1/n_1+n_2$. For a gain of 1:2 ($n_1=n_2=n$), for example, the ripple current in the output capacitor $C_2$ is only compensated by half, which even so signifies about 50% less ripple or a correspondingly lesser array of capacitors. The capacitor currents are shown in this case with dashed line in FIGS. 4c, 4d.

In order that transients across the input voltage $U_1$ will not effect the output voltage $U_2$, the input capacitor $C_1$ must be selected to be small in comparison with the output capacitor $C_2$. A suitable selection is to have $C_1$ as a paper or plastic film capacitor and $C_2$ as an electrolyte capacitor. If the capacitance of the capacitor $C_1$ is 100 times less than the capacitance of the capacitor $C_2$, a transient across the input voltage $U_1$ will be attenuated about 100 times if no notice is taken of the attenuation of the input filter $L_0$,$C_0$ and the capacity of the controlling circuit included in the converter for regulating the transient.

What is claimed is:

1. A fly-back type DC/DC converter for converting an incoming DC voltage comprising:
   a first and a second input terminal to receive said incoming DC voltage;
   a first and a second output terminal to transmit an outgoing DC voltage converted within said converter;
   an input filter having at least an input capacitor including first and second terminals;
   an inductance means;
   controllable switch means connected in series with said inductance means to constitute a series-connected means for controlling switching in said converter, said switch means being controllable to alternatively conducting and non-conducting states, and the series connected switch means and inductance means being connected between the second input and output terminals;
   an inductor coupling the series connected inductance means and switch means to said first input terminal;
   a capacitor means coupling said first and second input terminals;
   an output filter including an output capacitor including first and second terminals, the first terminal of said output capacitor being coupled to said first input terminal of said converter and to said second output terminal of said converter;
   a junction through which the second terminals of said input and output capacitors are interconnected, the junction of said second terminals of said input and output capacitors being connected to said first output terminal, said input and output capacitors being series connected between said second input terminal and said second output terminal so that, during operation of said switch means, ripple current from the input capacitor compensates ripple current through the output capacitor, and
   a unilateral conducting means being coupled in series with said switch means through no more than part of said inductance means to form a series connection of the unilateral conducting means and switch means between said junction and said second input terminal;
   the first terminal of said output capacitor being coupled between said first input terminal and said second output terminal, the first terminal of said input capacitor being coupled to said second input terminal and said switch means, the input and output capacitors being connected in series between said second input terminal and said series connected inductance means and switch means.

2. The converter of claim 1 wherein the inductance means includes an intermediate tap and said unilateral conducting means is connected between said intermediate tap and the second terminal of said output capacitor.

3. The converter of claim 1 wherein said inductance means includes two terminals at the extremities thereof and said switch means is connected to one of said terminals, said unilateral conducting means being connected to said one terminal between said inductance means and switching means.

* * * * *